United States Patent [19]

Nomura

[11] Patent Number: 5,168,201
[45] Date of Patent: Dec. 1, 1992

[54] SHIFTING-FIELD TYPE PERMANENT-MAGNET MOTOR

[76] Inventor: Takasi Nomura, 115-2, Shimoitou, Asahi-cho, Nyu-gun, Fukui-ken, Japan

[21] Appl. No.: 761,565

[22] Filed: Sep. 18, 1991

[30] Foreign Application Priority Data

Sep. 10, 1991 [JP] Japan .................................. 3-230221

[51] Int. Cl.$^5$ ........................................... H02K 23/44
[52] U.S. Cl. ................................. 318/538; 310/172
[58] Field of Search ............... 318/688, 244, 245, 292, 318/480, 538, 541, 430, 431; 310/172

[56] References Cited

U.S. PATENT DOCUMENTS

| 3,046,461 | 7/1962 | Luppold | 318/688 X |
| 3,153,754 | 10/1964 | McDonald | 318/688 X |
| 4,251,761 | 2/1981 | Williams | 318/689 X |

Primary Examiner—Bentsu Ro
Attorney, Agent, or Firm—Nikaido, Marmelstein, Murray & Oram

[57] ABSTRACT

A shifting-field type permanent-magnet motor includes a stator having a stator core, a shading coil and a multiple-layer coil assembly; a control unit for starting the motor and a control unit for free-running the motor for sequentially changing over the multiple-layer coils; and operating-mode changeover means for changing over from a starting operation to a free-running operation. The stator core has a generally donut-shaped main body, a plurality of protruding magnetic poles formed radially on both surfaces of the main body at a pitch of 45°, and radially drilled holes having a predetermined width in the circumferential direction. The shading coil has an inner ring arranged on an inner peripheral surface of the main body, an outer ring arranged on an outer peripheral surface of the main body, and connecting wires for connecting the inner ring and outer ring so as to interlink the protruding magnetic poles. The multiple-layer coil assembly is provided with a first coil wound while successively changing the winding direction, a second coil offset from the first coil by the pitch of 45°, a third coil offset from the second coil by the pitch of 45°, and a fourth coil offset from the third coil by the pitch of 45°. Rotors having permanent magnets of alternately different polarity at the pitch of 90° are arranged to oppose both sides of the stator.

6 Claims, 18 Drawing Sheets

——— : Counter-clockwise
----- : Clockwise

90°-135°

135°-180°

270°-315°

315°-360° a: Counter-clockwise
c: Clockwise

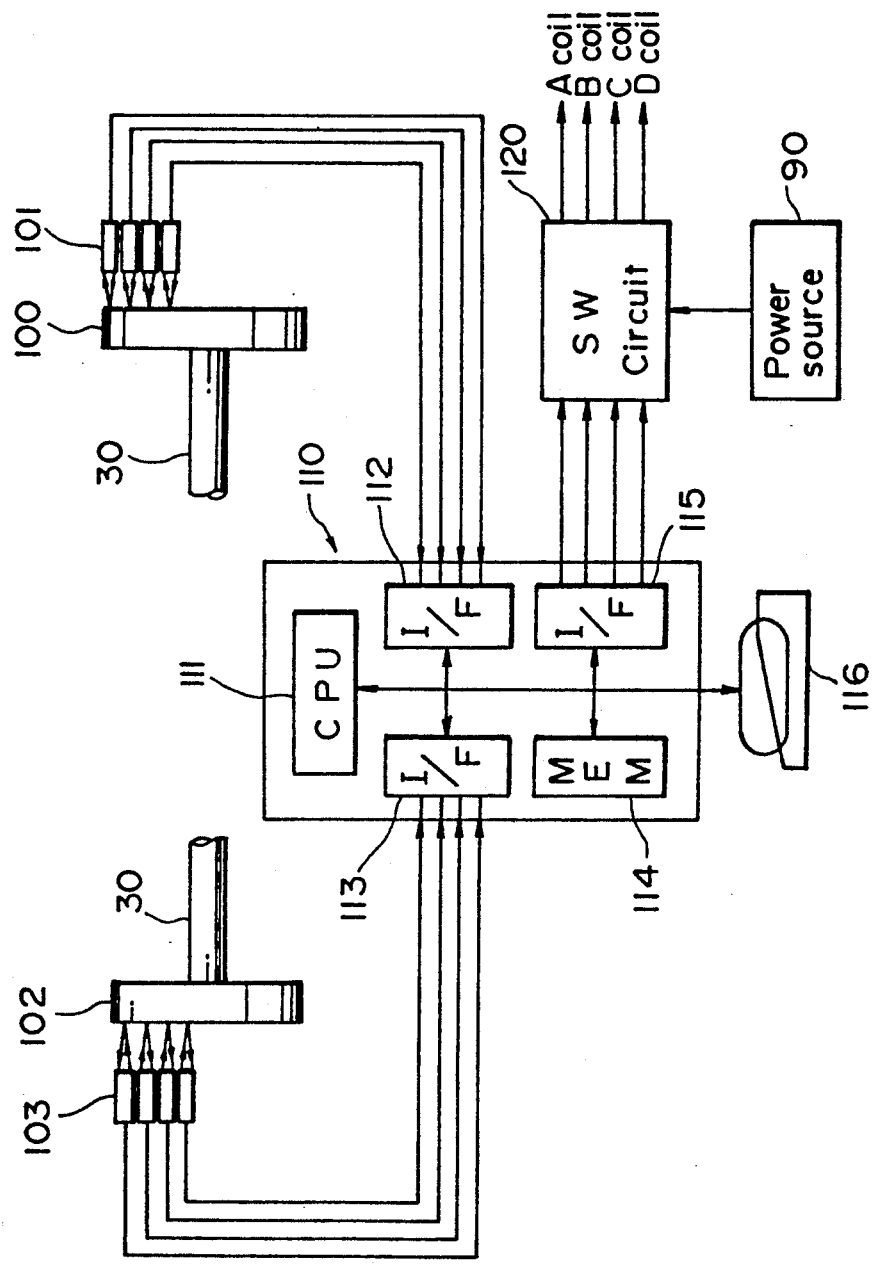

SHIFTING-FIELD TYPE PERMANENT-MAGNET MOTOR

BACKGROUND OF THE INVENTION

This invention relates to a shifting-field type permanent-magnet motor.

Conventionally, a DC motor is adapted to generate a magnetic field by a stator consisting of a yoke formed to have magnetic poles, and supply an armature, which is disposed in the magnetic field to serve as a rotor, with a direct current via brushes, whereby the armature is rotated.

In addition, a DC motor which uses a rotor having a permanent magnet also is well known.

However, the conventional DC motors of the type described above are difficult to start smoothly and consume a large amount of electric power. Furthermore, problems are encountered in terms of driving these motors at a high torque and in a reliable manner.

SUMMARY OF THE INVENTION

An object of the present invention is to provide a shifting-field type permanent-magnet motor which is easy to start, has a free-running capability and is energy efficient.

According to the present invention, the foregoing object is attained by providing a shifting-field type permanent-magnet motor comprising a stator having a stator core, a shading coil and a multiple-layer coil assembly; a pair of rotors arranged on both sides of the stator so as to embrace the stator; a control unit for starting and a control unit for free-running for sequentially changing over the multiple-layer coils; and operating-mode changeover means for changing over from a starting operation to a free-running operation when rotational speed of a rotary shaft attains a predetermined rotational speed. The stator core has a generally donut-shaped main body, a plurality of protruding magnetic poles formed radially on both surfaces of the main body at a predetermined pitch, and radially drilled holes having a predetermined width in the circumferential direction. The shading coil has an inner ring arranged on an inner peripheral surface of the main body, an outer ring arranged on an outer peripheral surface of the main body, and connecting wires for connecting the inner ring and outer ring so as to interlink the protruding magnetic poles. The multiple-layer coil assembly is provided with a first coil wound while successively changing the winding direction thereof at a pitch that is twice the predetermined pitch of the protruding magnetic poles, a second coil offset from the first coil by the predetermined pitch and wound while successively changing the winding direction thereof, a third coil offset from the second coil by the predetermined pitch and wound while successively changing the winding direction thereof, and a fourth coil offset from the third coil by the predetermined pitch and wound while successively changing the winding direction thereof. Permanent magnets of alternately different polarity are arranged on each rotor at a pitch offset by twice the predetermined pitch, the permanent magnets being made to oppose the protruding magnetic poles. A shifting magnetic field is produced by the shading coil to effect starting, the magnetic fields from the permanent magnets act upon the first through fourth coils owing to rotation of the rotary shaft, thereby producing an electromotive force. Owing to the electromotive force, the polarities of the protruding magnetic poles are changed so that the rotors are caused to free run by the repulsion of the permanent magnets brought about by the protruding magnetic poles.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a block diagram illustrating another embodiment of a controller for the shifting-field type permanent-magnet motor according to the present invention.

DESCRIPTION OF THE PREFERRED EMBODIMENT

An embodiment of the present invention will now be described in detail with reference to the drawings.

Figure 1:
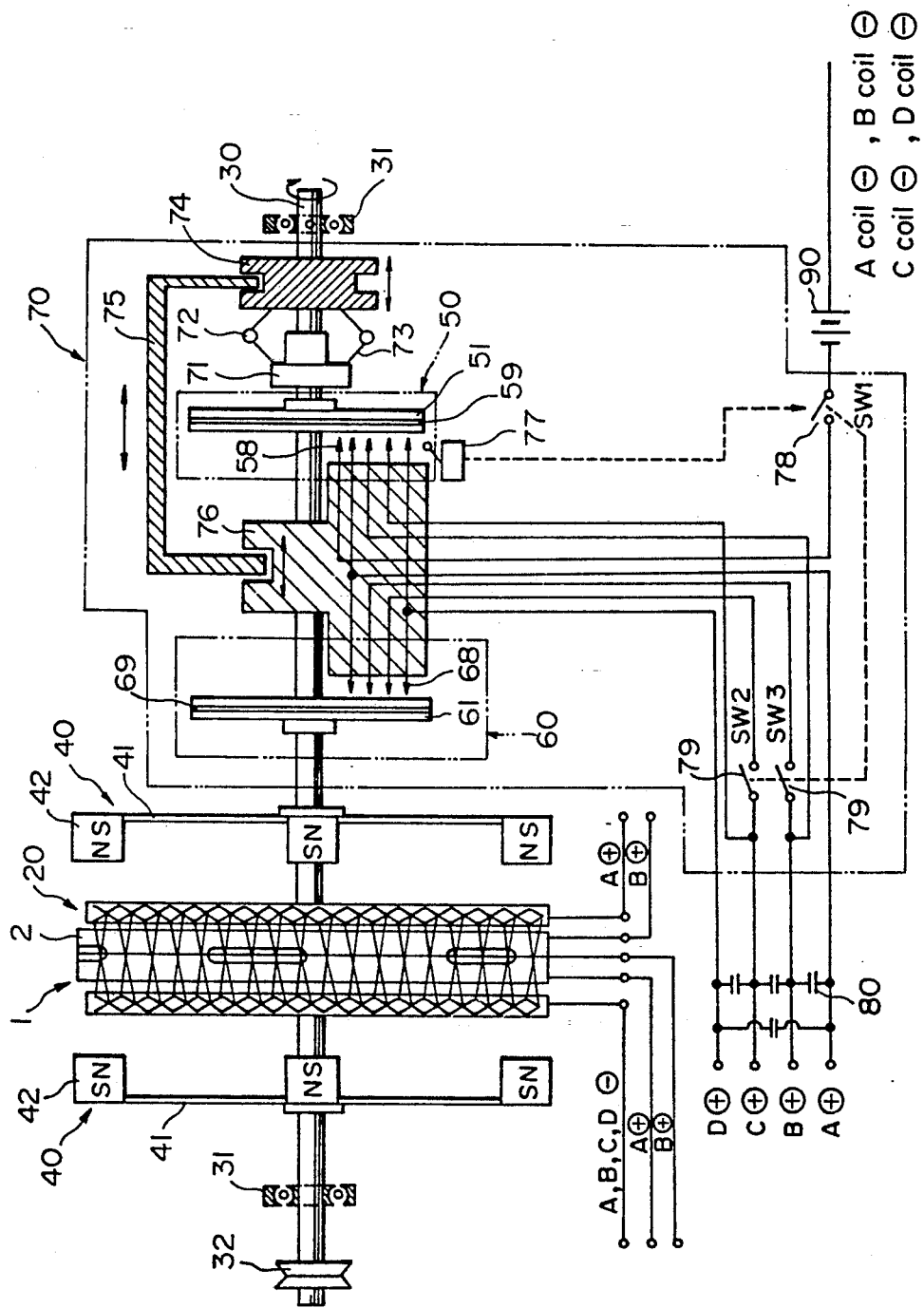
FIG. 1 is a diagram showing the overall construction of a shifting-field type permanent-magnet motor according to the present invention.

As shown in FIG. 1, a shifting-field type permanent-magnet motor according to the present invention includes a stator 1 comprising a stator core 2, a shading coil and a multiple-layer coil assembly; a pair of rotors 40 arranged on both sides of the stator 1 so as to embrace the stator 1; a starting control unit 50 for sequentially changing over multiple-layer coils 20 of the stator 1; a free-running control unit 60 for sequentially changing over the multiple-layer coils 20 of the stator 1; and an operating-mode changeover unit 70 for changing over from a starting operation to a free-running operation when a rotary shaft 30 attains a predetermined rotational speed.

Figure 3:
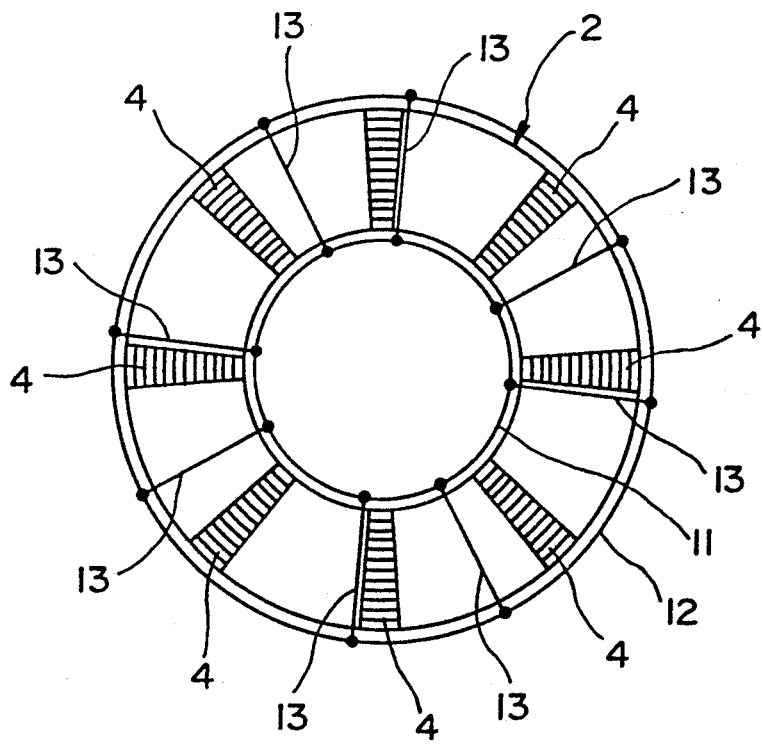
FIG. 3 is a plan view showing the stator core of a stator in the shifting-field type permanent-magnet motor according to the present invention.
Figure 4:
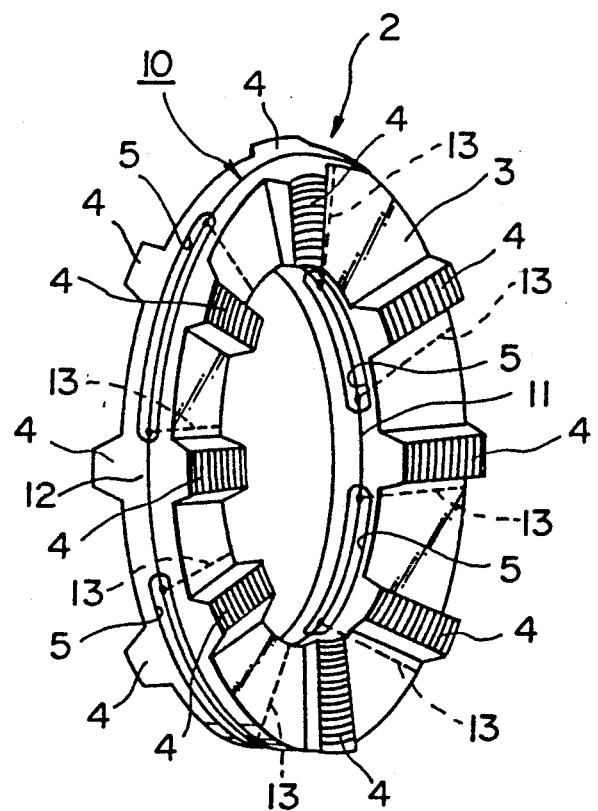
FIG. 4 is a perspective view showing the stator core of a stator in the shifting-field type permanent-magnet motor.
Figure 5:
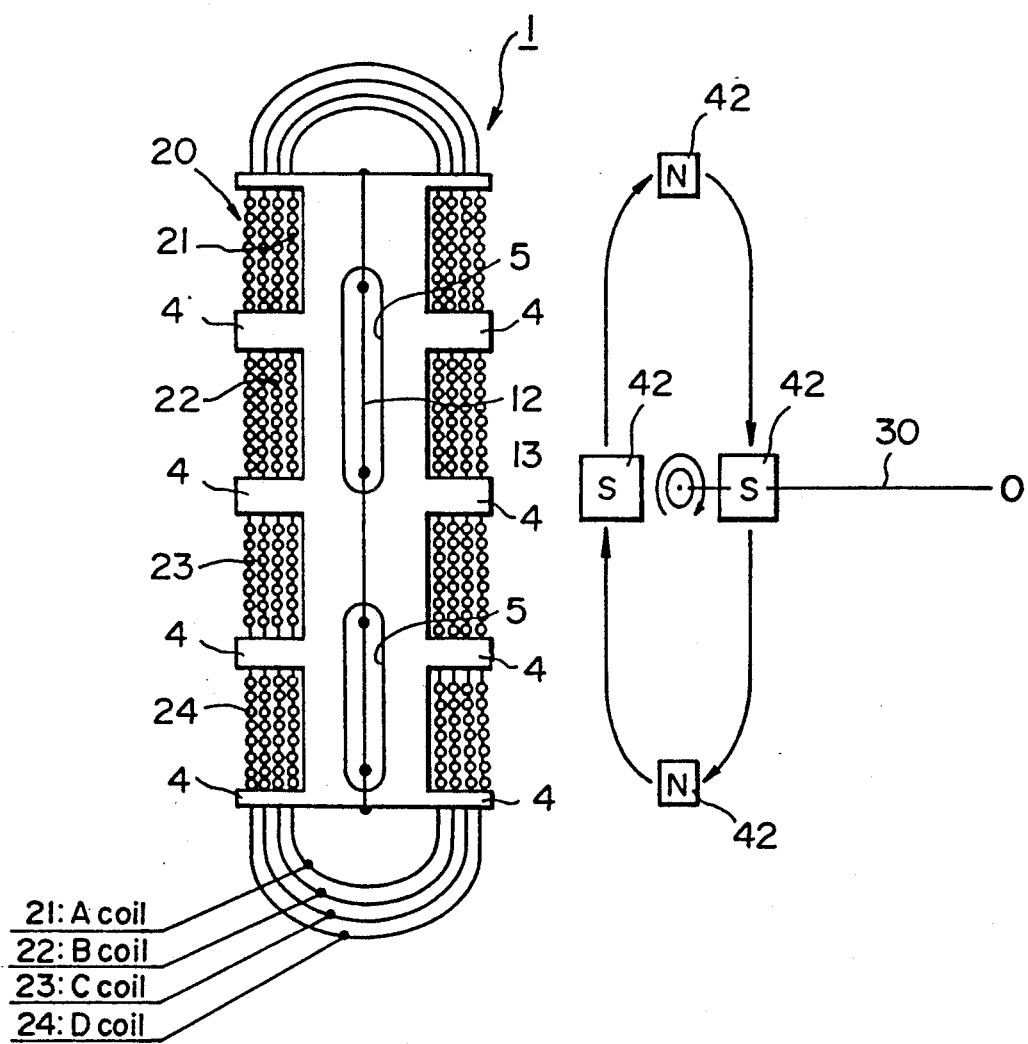
FIG. 5 is a partial sectional view showing the stator of the shifting-field type permanent-magnet motor.

As shown in FIGS. 3 through 5, the stator 1 comprises the stator core 2, the shading coil, shown at numeral 10, and the multiple-layer coil assembly 20.

The stator core 2 has a generally donut-shaped main body 3 comprising a silicon steel plate, eight protruding magnetic poles 4 formed radially on both surfaces of the main body 3 at a predetermined pitch of 45°, and radially drilled holes 5 having a predetermined width in the circumferential direction. The shading coil 10 comprises an inner ring 11 arranged on the inner peripheral surface of the main body 3 of the stator core 2, an outer ring 12 arranged on the outer peripheral surface of the main body 3 of the stator core 2, and connecting wires 13 for connecting the inner ring 11 and outer ring 12 so as to interlink the protruding magnetic poles 4.

A first coil (A coil) 21 is wound upon the thus constructed stator core 2 while successively changing the winding direction thereof at a pitch that is twice the pitch of the protruding magnetic poles, namely at a pitch of 90°. A second coil (B coil) 22, offset from the first coil 21 by 45°, is wound upon the first coil 21 while successively changing the winding direction thereof. A third coil (C coil) 23, offset from the second coil 22 by 45°, is wound upon the second coil 22 while successively changing the winding direction thereof. Finally, a fourth coil (D coil) 24, offset from the third coil 23 by 45°, is wound upon the third coil 23 while successively changing the winding direction thereof.

Thus, the stator core 2 is provided with the stator 1 having the shading coil 10 and the multiple-layer coil assembly 20. The stator 1 can be molded from a material such as resin if desired.

Figure 2A:
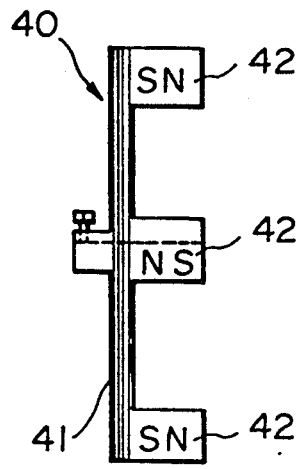
FIG. 2(a) is a side view showing a rotor of the shifting-field type permanent-magnet motor according to the present invention.
Figure 2B:
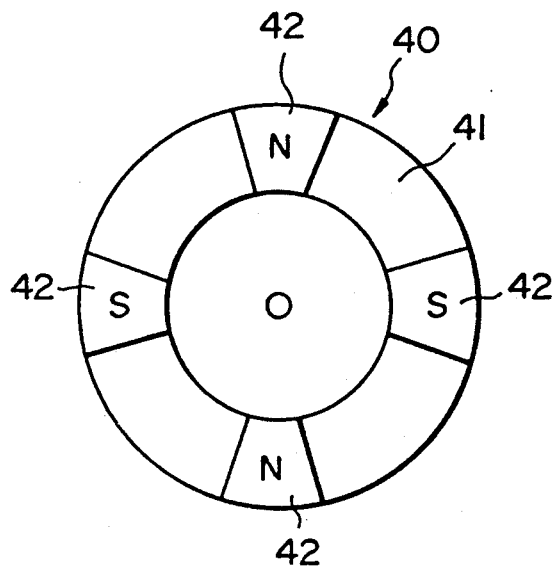
FIG. 2(b) is a front view showing the rotor of the shifting-field type permanent-magnet motor.

As shown in FIG. 1, the rotors 40 are arranged on both sides of the stator 1 so as to embrace the rotor 1. As illustrated in FIGS. 2(a) and 2(b), each rotor 40 is fixedly secured to the rotary shaft 30 and includes a generally donut-shaped main body 41 and permanent magnets 42 of alternately different polarity arranged on the side of the main body 41 that opposes the stator 1 at a pitch of 90° in correspondence with the pitch of the first through fourth coils 21–24.

Figure 6:
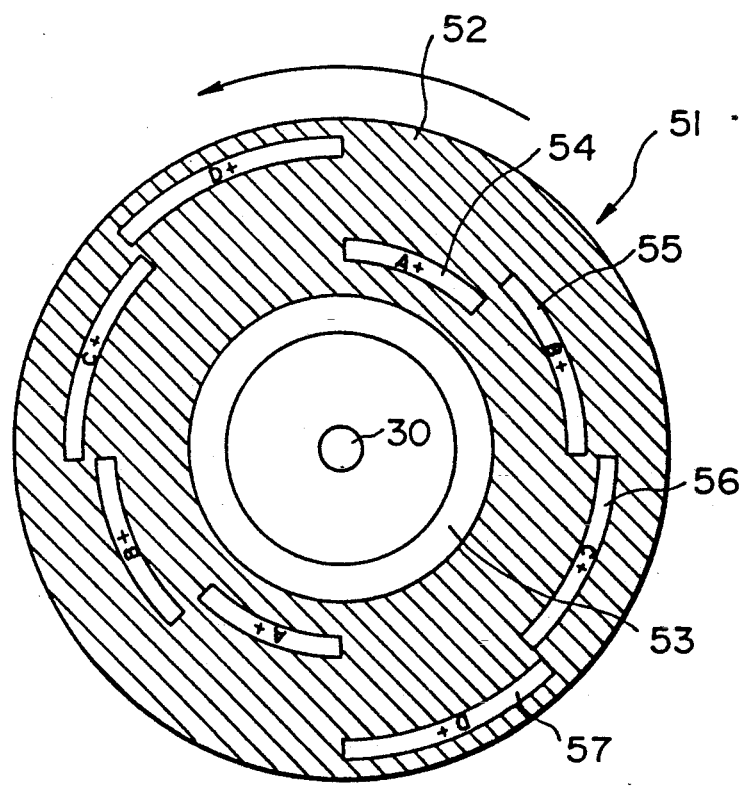
FIG. 6 is a plan view showing a starting commutator of the shifting-field type permanent-magnet motor according to the present invention.

The starting control unit 50 has a starting commutator 51 and brushes 58 contacting the commutator. As depicted in FIG. 6, the starting commutator 51 includes a surface 52 consisting of an insulator, and an electrically conductive plate 59 disposed on the underside of the surface 52. Demarcated portions of the electrically conductive surface of the plate 59 are exposed. Numeral 53 denotes an inner slip ring connected to a power supply 90. Electrically conductive surfaces 54, 55, 56, 57, which are disposed on the starting commutator 51 in the order mentioned starting from its inner side, are connected via the brushes 58 to the + sides of the A coil 21, B coil 22, C coil 23 and D coil 24, respectively. These electrically conductive surfaces 54, 55, 56, 57 have a width of 45° and are arranged one after another in the circumferential direction. Thus, the electrically conductive surfaces 54 through 57, which are for being connected to the respective coils, are formed so as to partition the surface 52 comprising the insulator. By bringing the brushes 58 into contact with these the electrically conductive surfaces 54 through 57, electric power from the power supply 90 is successively connected to the A coil 21, then the B coil 22, then the C coil 23 and finally the D coil 24, whereby starting can be effected in the form of a DC stepping motor.

As an example of a motor having such a drive system, the present applicant has already proposed a shifting-field type DC motor in Japanese Patent Application No. 2-297249. The proposed motor includes an annular stator for alternately producing N and S poles, though the stator coil is formed to have two layers, a rotor comprising a permanent magnet having magnetic poles corresponding to the N and S poles, control means for changing over the polarities of the N and S poles in synchronization with rotation of the rotary shaft of the rotor, and an annular shading coil for generating a shifting magnetic field at the time of starting.

Figure 7:
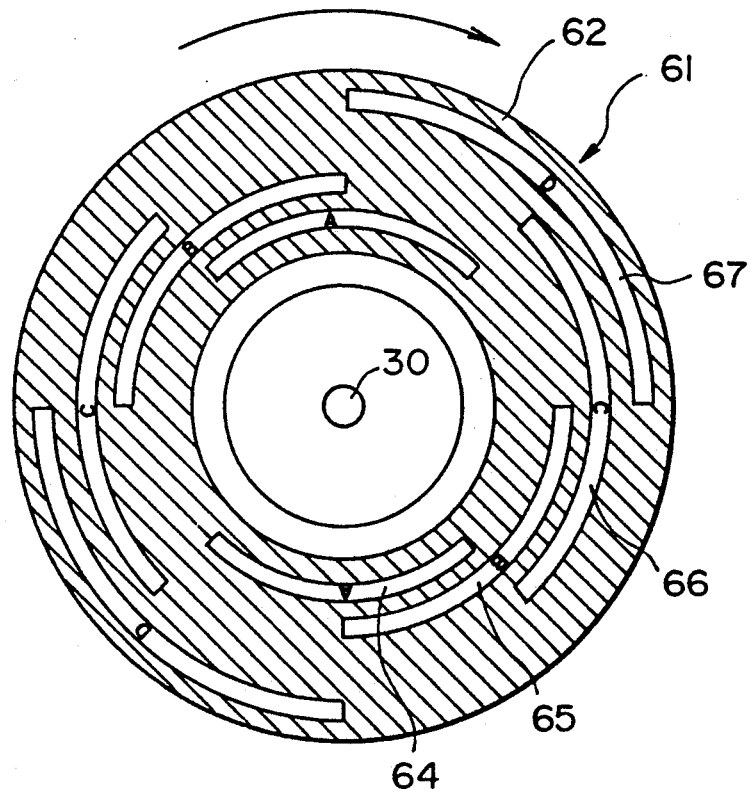
FIG. 7 is a plan view showing a free-running commutator of the shifting-field type permanent-magnet motor according to the present invention.

As shown in FIG. 1, the free-running control unit 60 has a free-running commutator 61 and brushes 68 contacting the commutator. As depicted in FIG. 7, the starting commutator 51 includes a surface 62 consisting of an insulator, and an electrically conductive plate 69 disposed on the underside of the surface 62. Demarcated portions of the electrically conductive surface of the plate 69 are exposed. Electrically conductive surfaces 64, 65, 66, 67, which are disposed on the free-running commutator 60 in the order mentioned starting from its inner side, are connected via the brushes 68 to the + sides of the A coil 21, B coil 22, C coil 23 and D coil 24, respectively. These electrically conductive surfaces 64, 65, 66, 67 have a width of 90° and are arranged one after another in the circumferential direction. Thus, the electrically conductive surfaces 64 through 67, which are for being connected to the respective coils, are formed so as to partition the surface 62 comprising the insulator. More specifically, the electrically conductive surfaces 67 and 64; 64 and 65; 65 and 66; 66 and 67 are shorted-circuited by contact with the brushes 68 over a 45° angle of rotation of the free-running commutator 61. Accordingly, by bringing the brushes 68 into contact with the electrically conductive surface of the free-running commutator, D coil 24 and A coil 21; A coil 21 and B coil 22; B coil 22 and C coil 23; and C coil 23 and D coil 24 are successively short-circuited, as shown in FIG. 17.

The operating-mode changeover unit 70 is for effecting a changeover from the starting operation to the free-running operation when the motor is started and the rotational speed of the rotary shaft 30 attains a predetermined rotational speed. The operating-mode changeover unit 70 includes a cylinder member 71 secured to the rotary shaft 30, a sliding cylinder member 74 free to slide in the axial direction of the rotary shaft 30, a coupling 73 which has its one end secured to the cylinder member 71 and its other end secured to the sliding cylinder member 74, and which possesses a weight 72 displaced by centrifugal force, and a bridge-shaped arm 75 interposed between the sliding cylinder member 74 and a brush holder 76 supported on the rotary shaft 30 so as to be free to slide in the axial direction thereof. The brush holder 76 has the brushes 58 which contact the starting commutator 51 when the motor is started, and the brushes 68 which contact the free-running commutator 61 when the motor is free-running. Further, there are provided a responsive switch 77 actuated in response to movement of the brush holder 76, a power-supply switch 78 opened and closed based upon operation of the responsive switch 77, and a switch 79 provided on the side of a circuit for the free-running operation. The power-supply switch 78 and the switch 79 operate in association in such a manner that when switch 78 is closed, switch 79 opens, and vice versa.

The ends of the rotary shaft 30 are provided with bearings 31, and a pulley 32 is provided on the output side of the rotary shaft 30.

The DC power supply 90 employs a battery, by way of example. Capacitors 80 are connected across the A through D coils in order to prevent noise.

It is required that the shading coil 10 use a shading wire which does not have an insulative coating. In particular, therefore, it is required that electromotive force produced by cutting of the flux of the permanent magnets by the connecting wires 13 be eliminated. To accomplish this, the shading coil 10 is placed in the holes 5 of the stator core 2 to be electromagnetically shielded.

The operation of the shifting-field type permanent-magnet motor of this embodiment will now be described with reference to FIG. 1 and FIGS. 8 through 18.

When the power-supply switch 78 (see FIG. 1) is closed, a current flows into the A through D coils via the starting control unit 50 so that a shifting-field is generated by the shading coil 10, thereby starting the rotors 40. When the rotational speed of the rotary shaft 30 exceeds a predetermined rotational speed, the weight 72 is outwardly displayed by the centrifugal force of the rotary shaft 30, as a result of which the coupling 73 contracts to move the sliding cylinder member 74 to the left. When this occurs, the bridge-shaped arm 75 is moved leftward so that the brush holder 76 also is moved leftward and the free-running control unit 60 is driven into operation. The leftward movement of the brush holder 76 is accompanied by actuation of the responsive switch 77, opening of the power-supply switch 78 and closure of the switch 79 on the side of the load. Thus, a changeover is made from the starting operation to the free-running operation.

The free-running operation will now be described in detail with reference to FIGS. 8 through 18.

Figure 8:
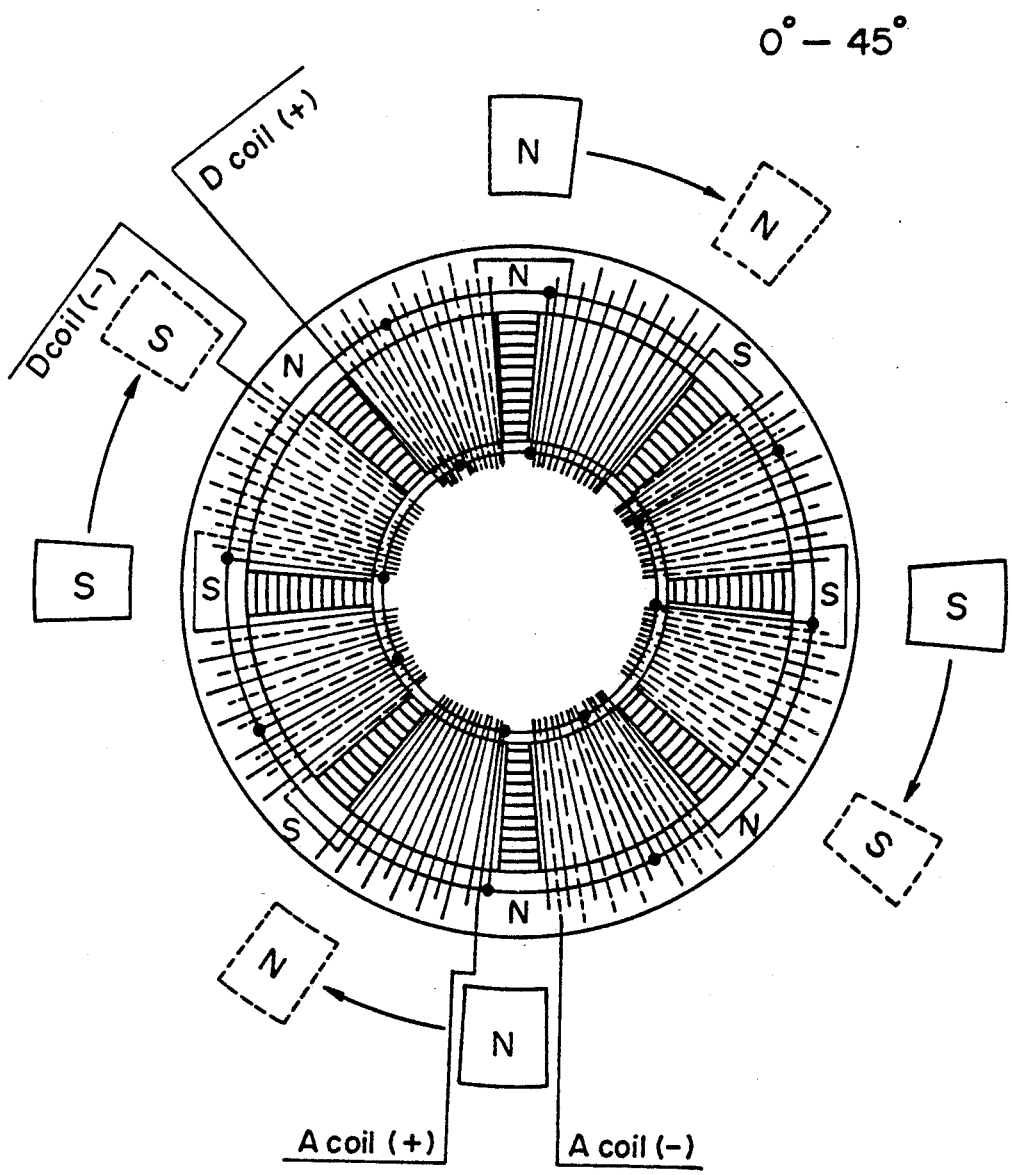
FIG. 8 is an explanatory view showing a 0°–45° rotating mechanism for the rotor of the shifting-field type permanent-magnet motor according to the present invention.
Figure 17A:
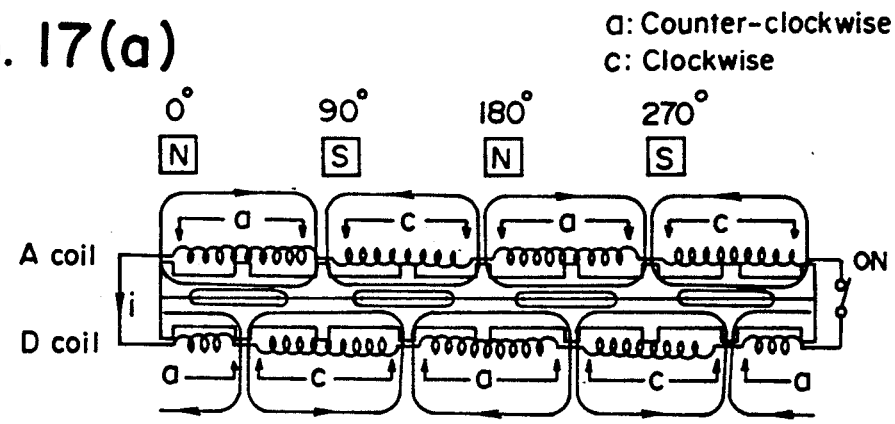
FIGS. 17a to 17d are explanatory views showing a mechanism which generates magnetic fields for free-running of the shifting-field type permanent-magnet motor according to the present invention.

First, in a case where the rotors 40 are rotated from an electric angle 0° to an electrical angle 45°, the A coil 21 and the D coil 24 are short-circuited by the free-running commutator 61, as shown in FIG. 8. More specifically, as illustrated in FIG. 17(a), the A coil 21 has a coil arrangement in which the coil is wound counter-clockwise (leftward) from the electrical angle 0° to 90°, clockwise (rightward) from 90° to 180°, counter-clockwise (leftward) from 180° to 270°, and clockwise (rightward) from 270° to 360°. On the other hand, the D coil 24 has a winding direction advanced by a pitch of 45° relative to the A coil 21. In other words, the D coil 21 is wound counter-clockwise (leftward) from 0° to 45°, clockwise (rightward) from 45° to 135°, counter-clockwise (leftward) from 135° to 225°, clockwise (rightward) from 225° to 315°, and counter-clockwise (leftward) from 315° to 360°.

Figure 17B:
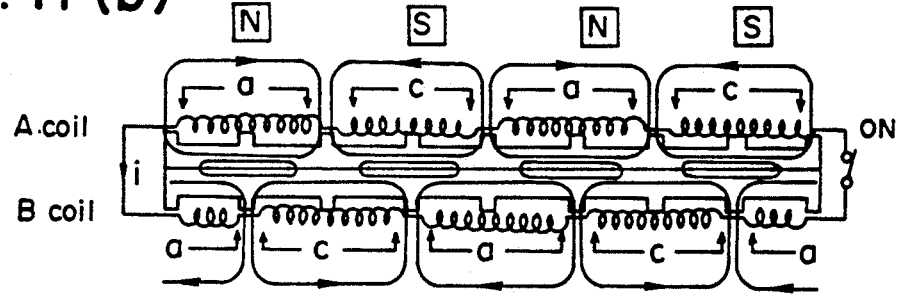

Next, the A coil 21 and the B coil 22 are short-circuited by the free-running commutator 61, as illustrated in FIG. 17(b).

Figure 17C:
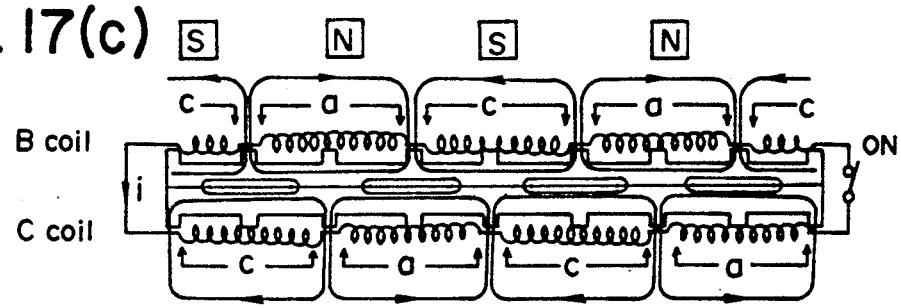

Next, the B coil 22 and the C coil 23 are short-circuited by the free-running commutator 61, as illustrated in FIG. 17(c).

Figure 17D:
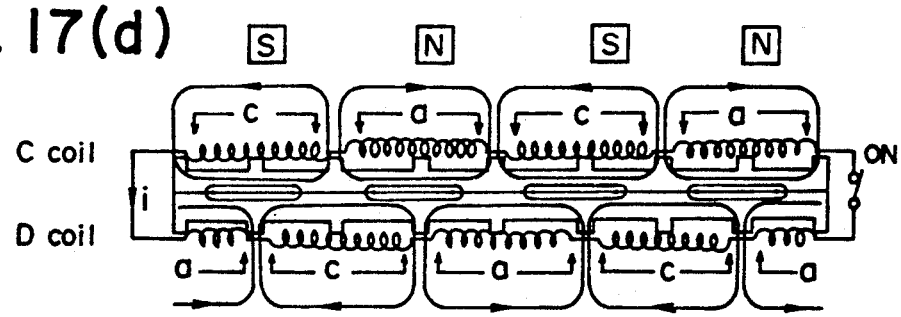

Next, the C coil 23 and the D coil 24 are short-circuited by the free-running commutator 61, as illustrated in FIG. 17(d).

Thus, two sets of coils are short-circuited one after another.

Figure 16:
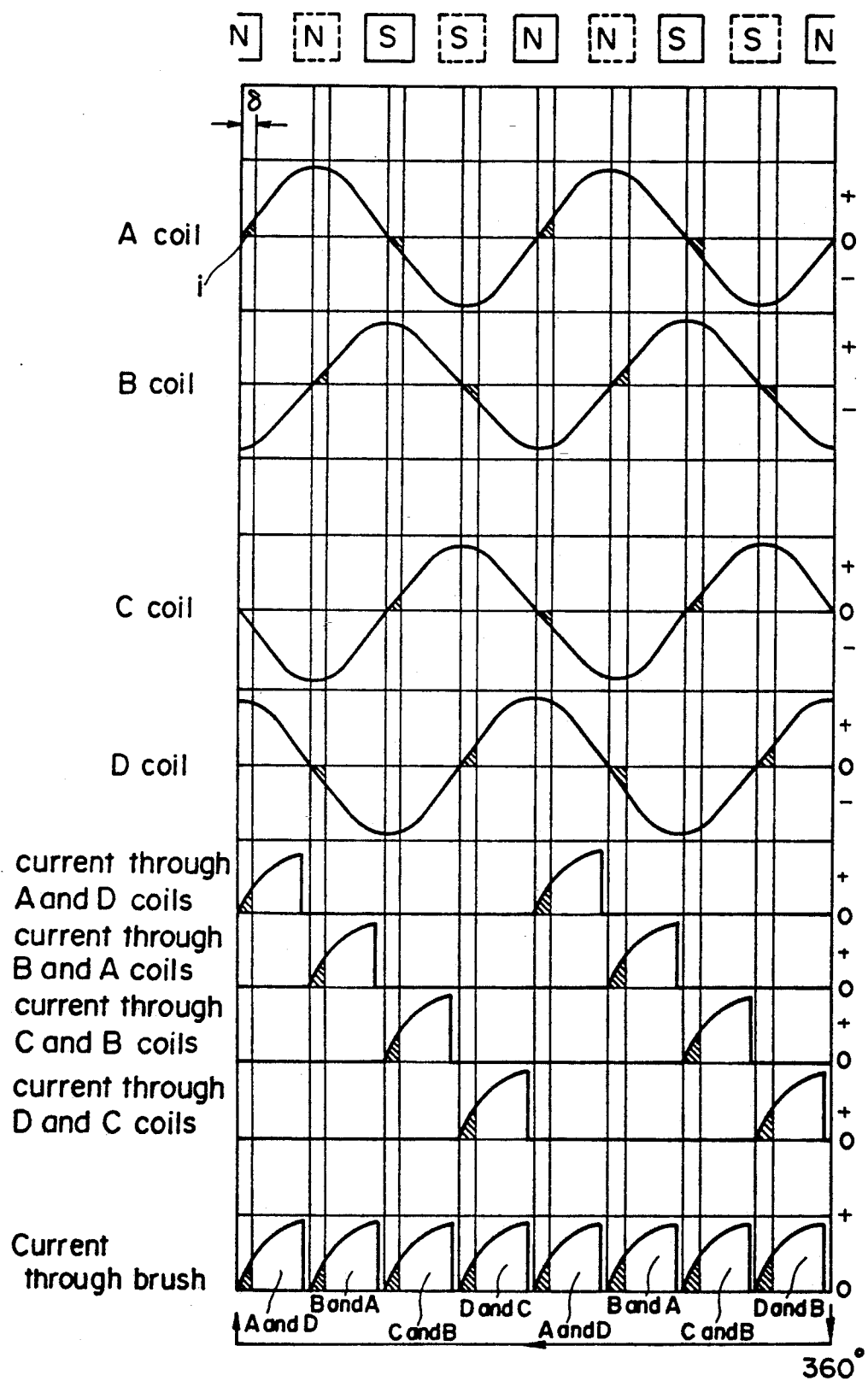
FIG. 16 is a waveform diagram showing currents in various portions of the shifting-field type permanent-magnet motor according to the present invention.
Figure 18:
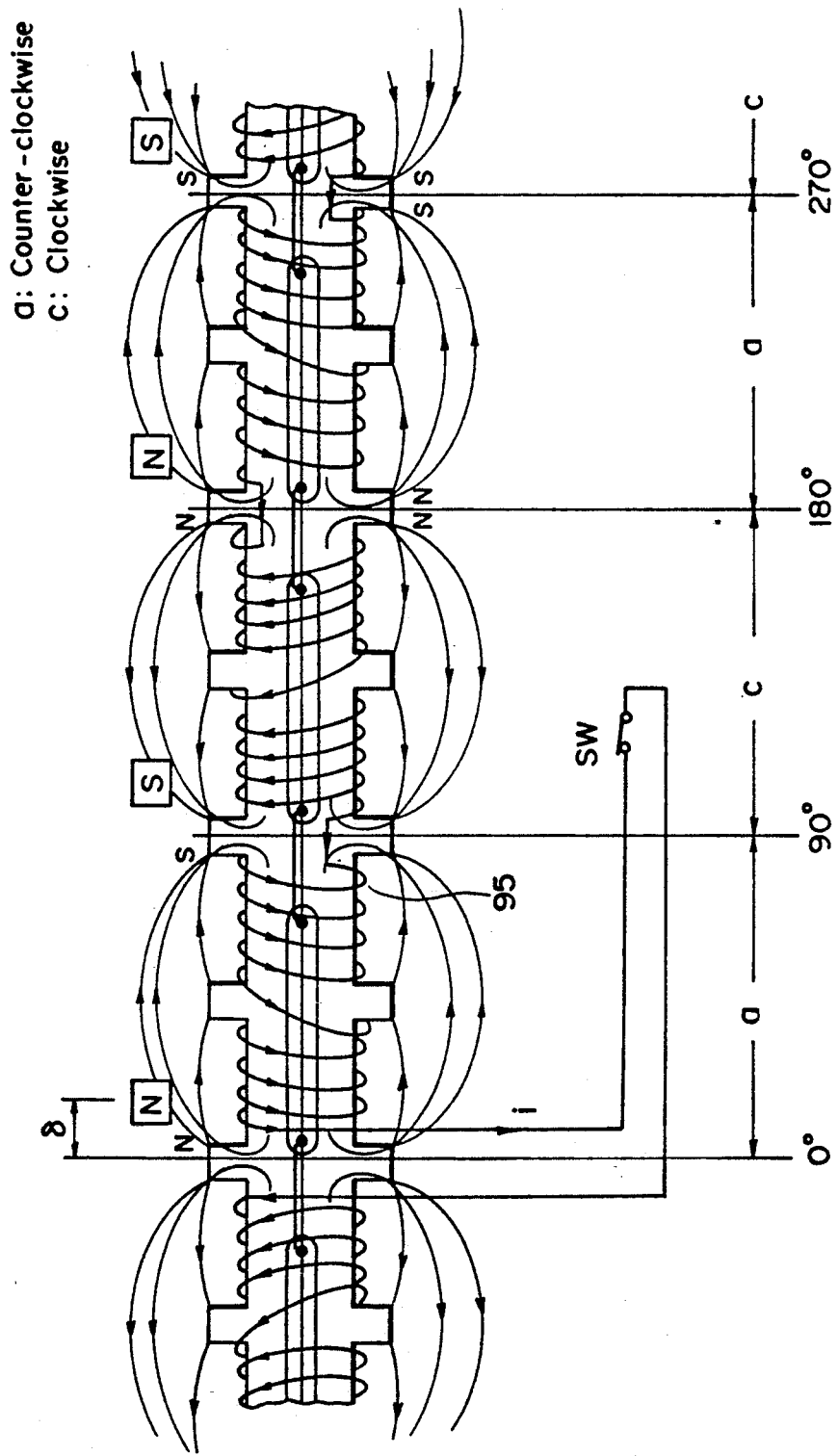
FIG. 18 is a partially enlarged view of FIG. 17.

When, in the case where the A coil 21 and D coil 24 are short-circuited as shown in FIG. 17(a), one of the permanent magnets 42 of the rotors 40 passes the electrical angle 0° and this permanent magnet 42 is an N pole, a current i shown in FIG. 18 is induced in an equivalent coil 95, which is a combination of the A coil 21 and D coil 24, owing to movement of the N pole. As a result of this induced current i, a magnetic field of the kind shown in FIG. 18 is generated so that an N pole is produced in the protruding magnetic pole 4. This N pole repels the N pole of the permanent magnet 42, as a result of which the permanent magnet 42 produces a rotating force. The same action occurs also at the electrical angle 180°. At the electrical angles of 90° and 270°, the polarities of the permanent magnets 42 change to that of the S pole. However, since the directions in which the coils have been wound change at these points, the permanent magnets 42 are capable of producing a rotating force, just as described above. Since the magnetic field is shifted at the electrical angle 0° by the magnetic field produced by the shading coil 10, the permanent magnet 42 is situated at an electrical angle of $0°+\delta°$. As a consequence, the rotating force can be obtained from the permanent magnet 42 owing to the induced current i from the coil corresponding to this lead angle, as depicted in FIG. 16.

Thus, the rotors 40 are rotated from the electrical angle 0° to the electrical angle 45°.

In FIG. 18, each coil actually wound is not shown. Only the coils which generate the magnetic fields which actually act upon the permanent magnets 42 of the rotors are illustrated using the equivalent coil 95.

Figure 9:
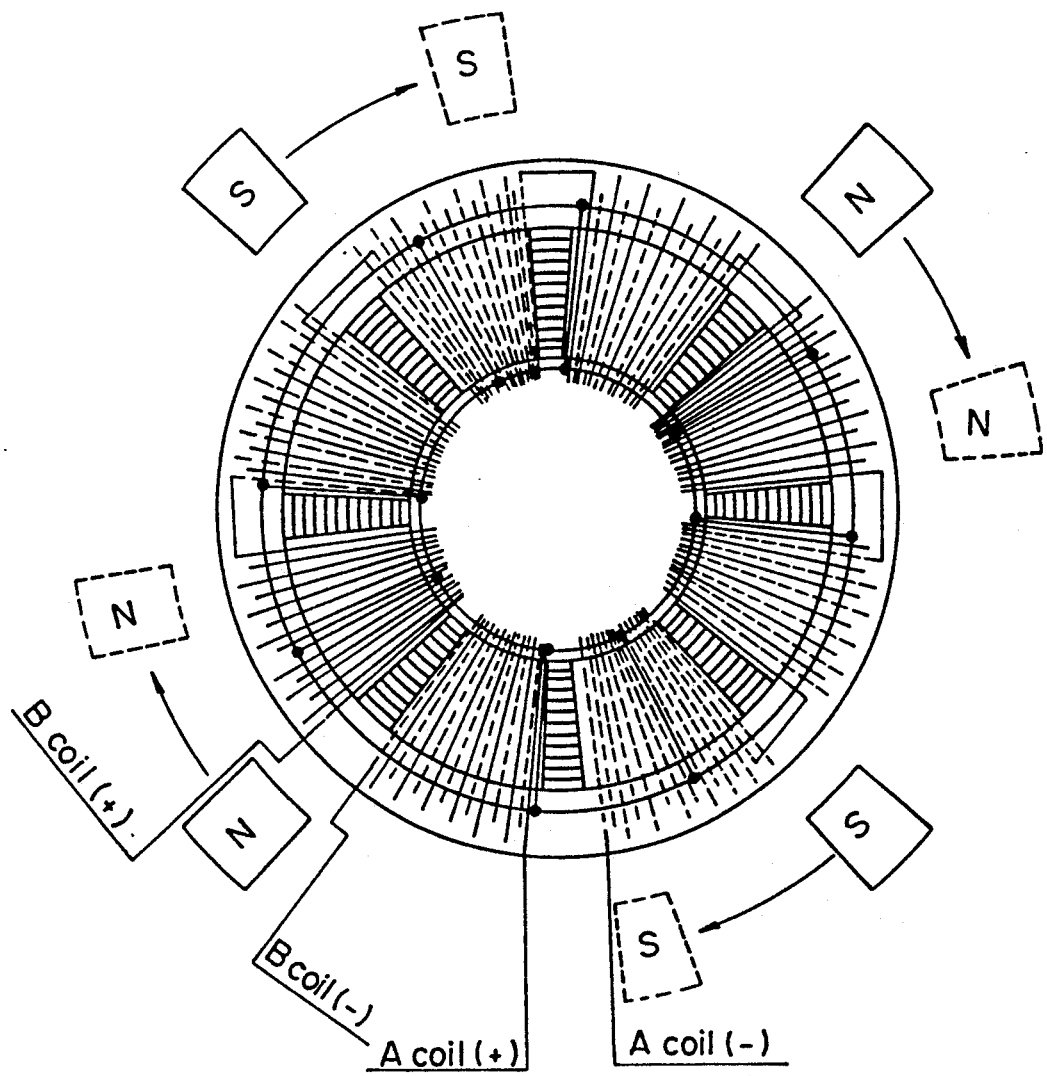
FIG. 9 is an explanatory view showing a 45°–90° rotating mechanism for the rotor of the shifting-field type permanent-magnet motor according to the present invention.

Next, from the electrical angle 45° to the electrical angle 90°, the A coil 21 and the B coil 22 are short-circuited by the free-running commutator 61, as shown in FIG. 9, and the induced current i is produced so that a rotating force can be obtained from the permanent magnet 42, as illustrated in FIG. 17(b).

Figure 10:
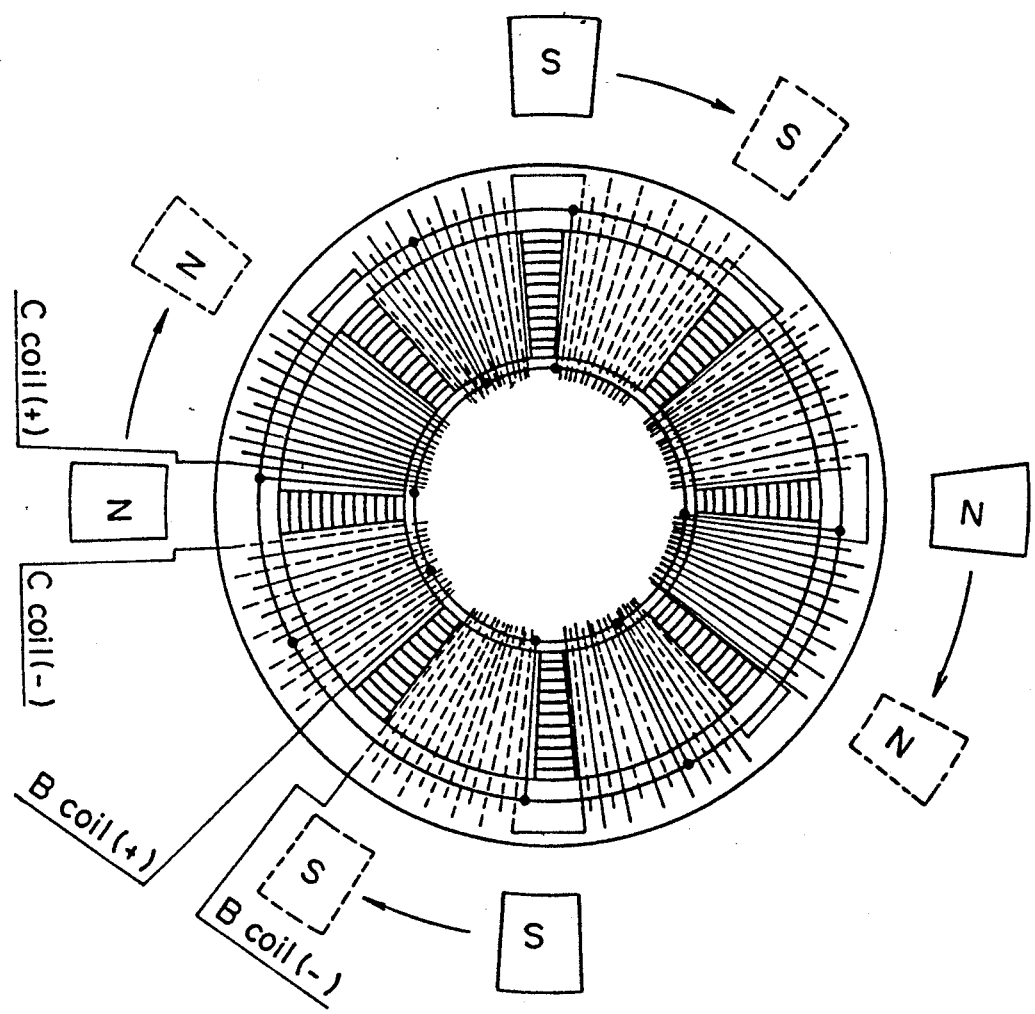
FIG. 10 is an explanatory view showing a 90°–135° rotating mechanism for the rotor of the shifting-field type permanent-magnet motor according to the present invention.

Next, from the electrical angle 90° to the electrical angle 135°, the B coil 22 and the C coil 23 are short-circuited by the free-running commutator 61, as shown in FIG. 10, and the induced current i is produced so that a rotating force can be obtained from the permanent magnet 42, as illustrated in FIG. 17(c).

Figure 11:
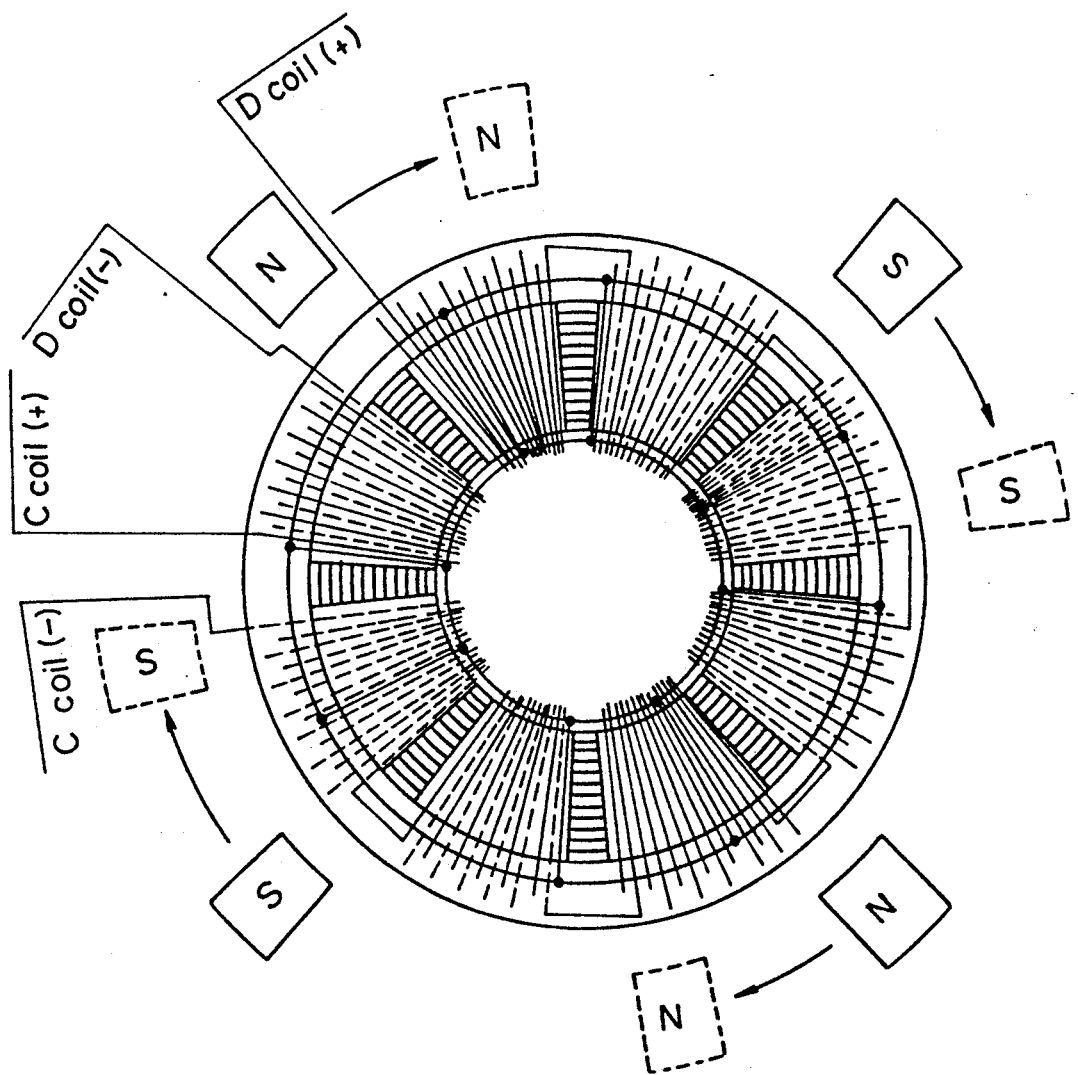
FIG. 11 is an explanatory view showing a 135°–180° rotating mechanism for the rotor of the shifting-field type permanent-magnet motor according to the present invention.

Next, from the electrical angle 135° to the electrical angle 180°, the C coil 23 and the D coil 24 are short-circuited by the free-running commutator 61, as shown in FIG. 11, and the induced current i is produced so that a rotating force can be obtained from the permanent magnet 42, as illustrated in FIG. 17(d).

Figure 12:
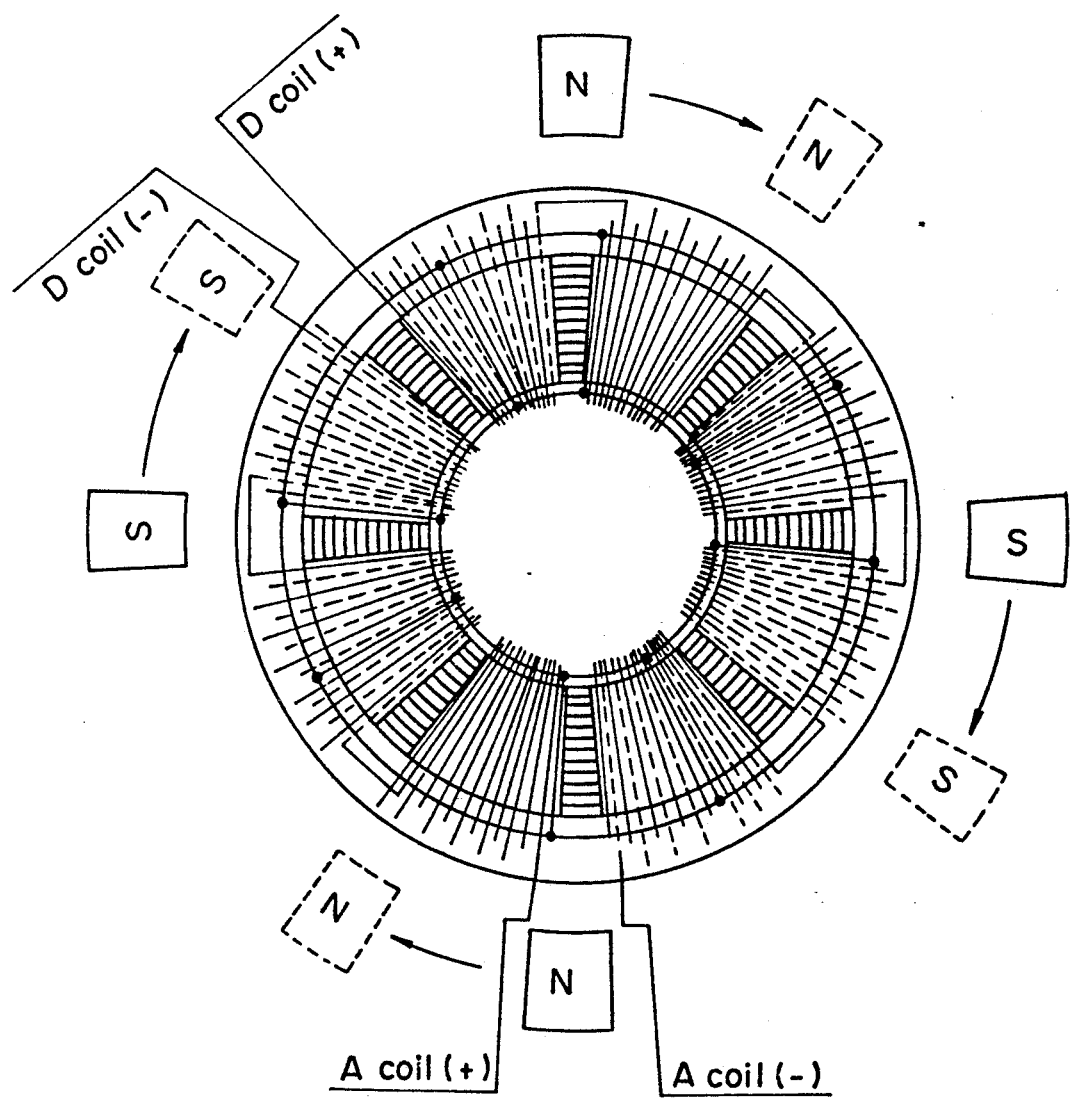
FIG. 12 is an explanatory view showing a 180°–225° rotating mechanism for the rotor of the shifting-field type permanent-magnet motor according to the present invention.
Figure 13:
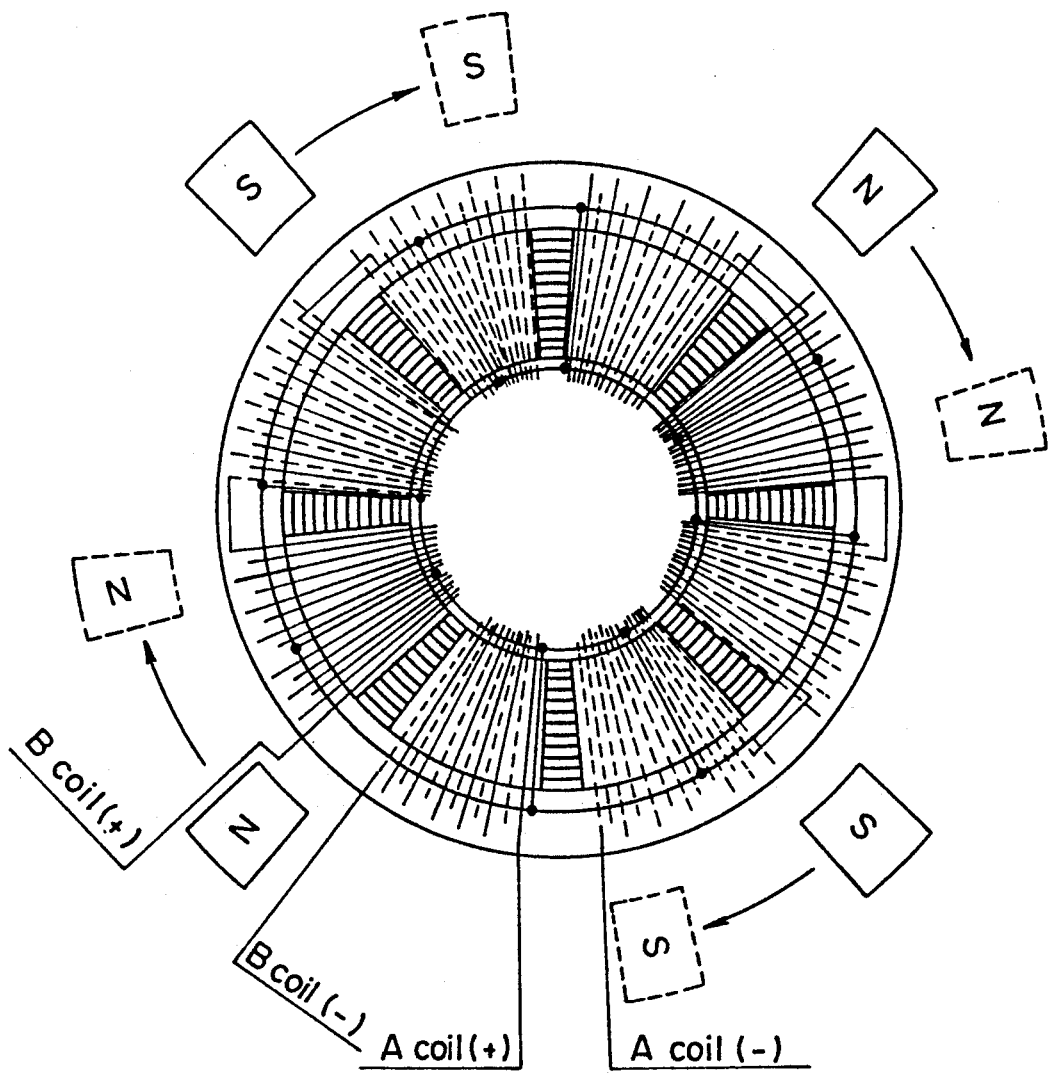
FIG. 13 is an explanatory view showing a 225°–270° rotating mechanism for the rotor of the shifting-field type permanent-magnet motor according to the present invention.
Figure 14:
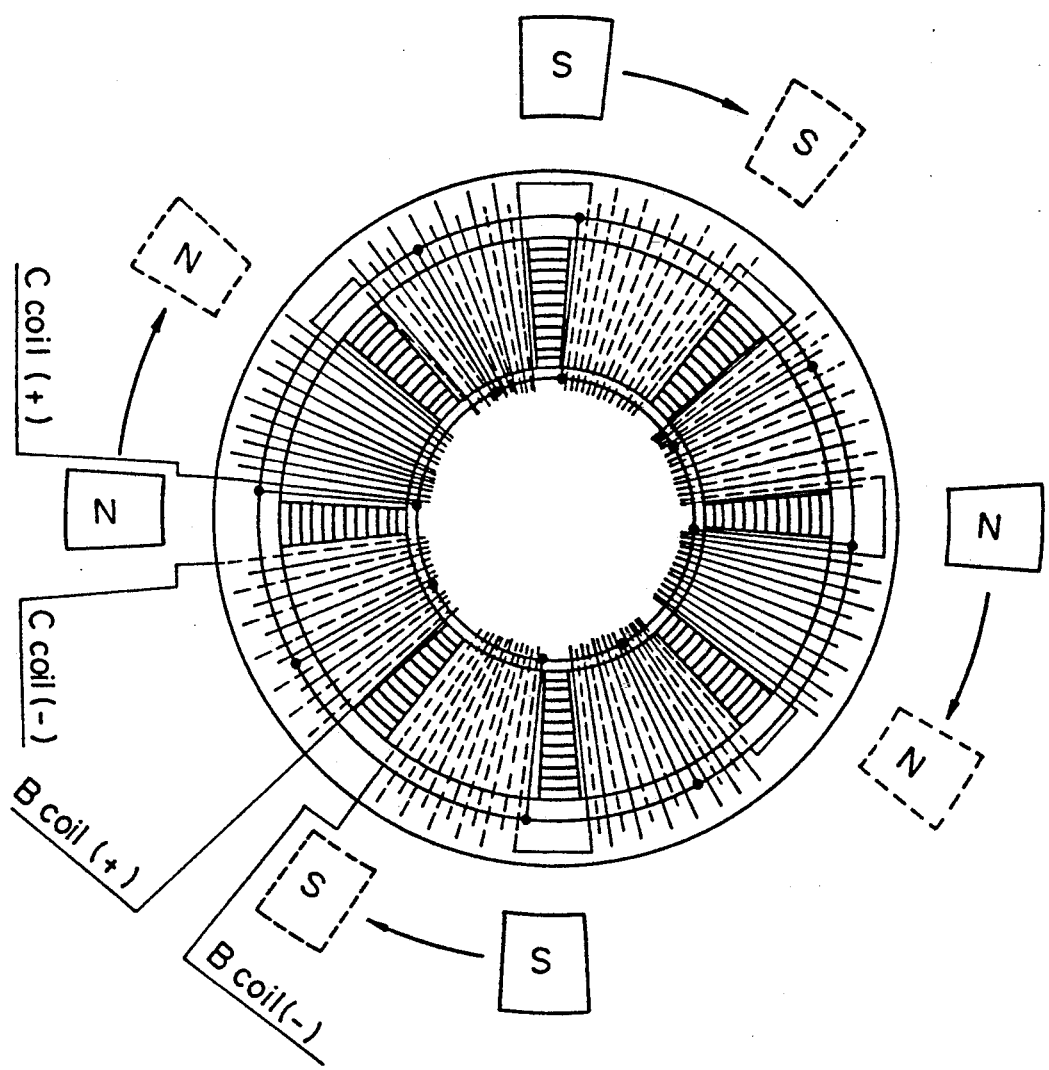
FIG. 14 is an explanatory view showing a 270°–310° rotating mechanism for the rotor of the shifting-field type permanent-magnet motor according to the present invention.
Figure 15:
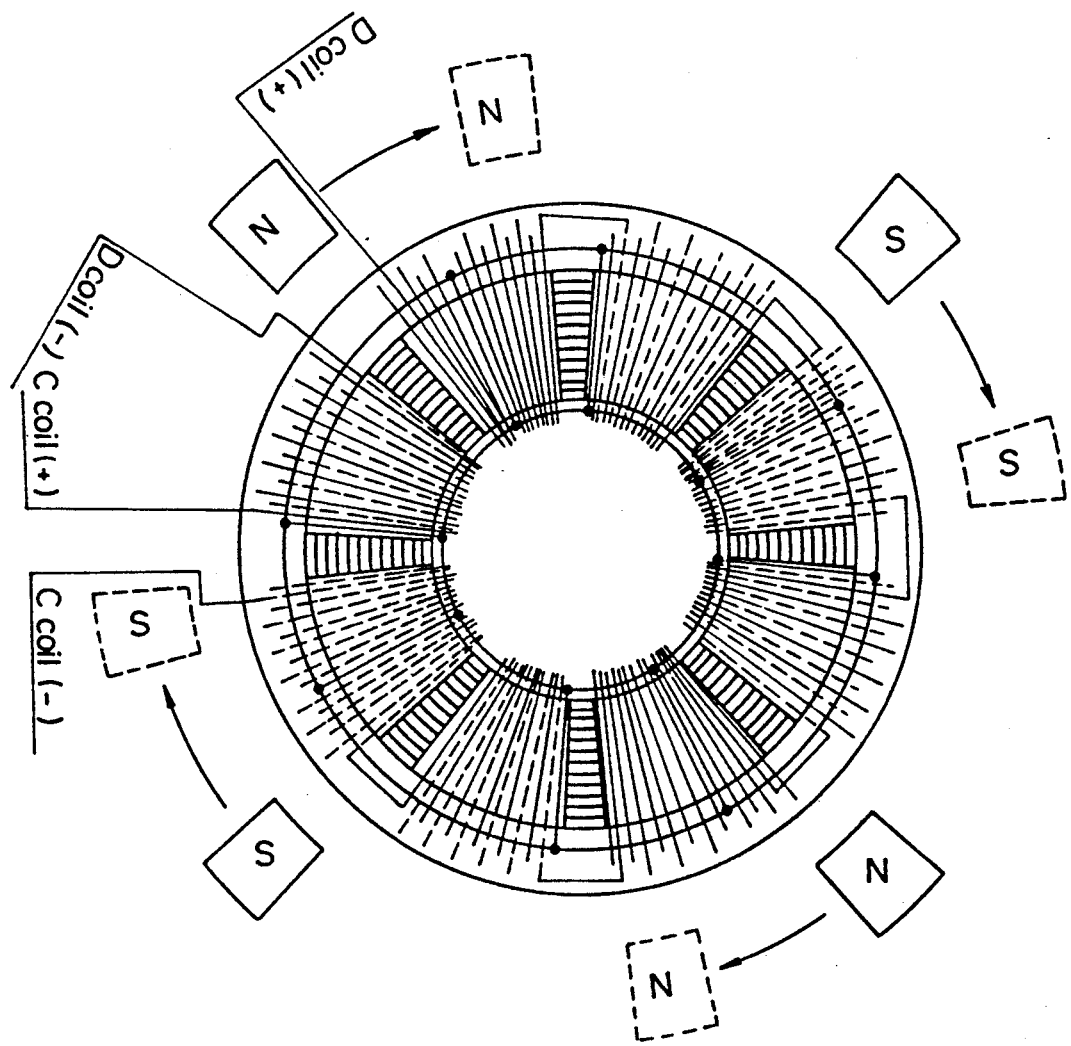
FIG. 15 is an explanatory view showing a 315°–360° rotating mechanism for the rotor of the shifting-field type permanent-magnet motor according to the present invention.

Thereafter, and in similar fashion, short-circuiting of pairs of the coils is performed successively from the electrical angle 135° to 180°, as shown in FIG. 12; from the electrical angle 180° to 225°, as shown in FIG. 13; from the electrical angle 225° to 270°, as shown in FIG. 14; from the electrical angle 270° to 315°, as shown in FIG. 15; and from the electrical angle 315° to 360°, as shown in FIG. 16. Thus, the induced current i is successively produced so that the permanent magnets 42 of rotors 40 can be kept rotating.

Thus, the motor is capable of free-running operation. However, in a case where the rotational speed by free-running operation falls below a predetermined value owing to an excessively large load or malfunction, the weight 72 shown in FIG. 1 is displaced toward the inward side, as a result of which the coupling 73 expands so that the sliding cylinder 74 is moved to the right. When this occurs, the bridge-shaped arm 75 is moved to the right, and therefore the brush holder 76 also is moved to the right and the starting control unit 50 is driven into operation. Accordingly, a changeover is made to the starting operation so that rotation of the motor can be backed up.

In a case where it is desired to stop the free-running operation, the switch 79 on the side of the load is turned off, whereby free-running can be halted.

FIG. 19 is a block diagram showing the electronic control system of the shifting-field type permanent-magnet motor illustrative of another embodiment of the present invention.

In FIG. 19, numeral 100 denotes a starting rotary encoder provided on one end of the rotary shaft 30 instead of the starting commutator, 101 an optical reader opposing the starting rotary encoder 100, 102 a rotary encoder, for the free-running operation, provided on the other end of the rotary shaft 30 instead of the commutator for the free-running operation, and 103 an optical reader opposing the free-running rotary encoder 102. Further, numeral 110 denotes an electronic controller having a CPU 111, input interfaces 112, 113, a memory 114, an output interface 115 and a data input unit 116. Numeral 120 designates a switching circuit for turning the power supply 90 on and off and short-circuiting the A-D coils of the stator 1.

In this embodiment, patterns (not shown) on which the rotational angle of the rotary shaft 30 are coded are formed on the rotary encoders 100, 102 provided on the respective ends of the rotary shaft 30.

In the case of the starting operation, the code on the rotary encoder 100 provided on one end of the rotary shaft 30 is read by the optical reader 101, and the information indicative of the rotational angle of the rotary shaft 30 is read in by the electronic controller 110. On the basis of a signal outputted from the controller 110, the electric power from the power supply 90 is switched by a switching circuit using a transistor switching element, for example, whereby it is possible to control the flow of current to the A through D coils 21-24 of the stator 1.

In case of the free-running operation, the code on the rotary encoder 102 provided on the other end of the rotary shaft 30 is read by the optical reader 103, and the information indicative of the rotational angle of the rotary shaft 30 is read in by the electronic controller 110. On the basis of a signal outputted from the controller 110, the A coil 21 and D coil 24, the A coil 21 and B coil 22, the B coil 22 and C coil 23, and the C coil 23 and D coil 24 are short-circuited, in the manner described earlier. Thus, control for the free-running operation is performed to keep the rotors 40 rotating.

Thus, in accordance with the present invention as described above, the following advantages can be obtained:

(1) There can be obtained an energy-efficient motor that is easy to start, in which it is possible for the rotors to be kept rotating even if the power supply is turned off.

(2) Since a rotational torque is obtained by arranging a pair of rotors to oppose each other across a stator, a compact, high-torque motor can be obtained.

As many apparently widely different embodiments of the present invention can be made without departing from the spirit and scope thereof, it is to be understood that the invention is not limited to the specific embodiments thereof except as defined in the appended claims.

What we claim is:

1. A shifting-field type permanent-magnet motor comprising:
   (a) a stator having a stator core, a shading coil and a multiple-layer coil assembly;
      (i) said stator core including:
         (1) a generally donut-shaped main body;
         (2) a plurality of protruding magnetic poles formed radially on both surfaces of said main body at a predetermined pitch; and
         (3) radially drilled holes having a predetermined width in the circumferential direction;
      (ii) said shading coil including:
         (1) an inner ring arranged on an inner peripheral surface of said main body;
         (2) outer ring arranged outer peripheral surface of said main body; and
         (3) connecting wires for connecting said inner ring and said outer ring so as to interlink said protruding magnetic poles;
      (iii) said multiple-layer coil assembly including:
         (1) a first coil wound while successively changing the winding direction thereof at a pitch that is twice the predetermined pitch of said protruding magnetic poles;
         (2) a second coil offset from said first coil by said predetermined pitch and wound while successively changing the winding direction thereof;
         (3) a third coil offset from said second coil by said predetermined pitch and wound while successively changing the winding direction thereof; and
         (4) a fourth coil offset from said third coil and wound while successively changing the winding direction thereof;
   (b) a pair of rotors arranged on both sides of said stator so as to embrace said stator;
      (i) each of said rotors including:
         (1) a generally donut-shaped main body secured to a rotary shaft; and
         (2) permanent magnets of alternately different polarity, arranged on a surface of said main body which opposes said stator, at a pitch corresponding to the pitch of said first through fourth coils;

(c) a starting control unit for sequentially changing over said first through fourth coils;

(d) a free-running control unit for sequentially changing over said first through fourth coils; and (e) operating-mode changeover means for changing over from a starting operation to a free-running operation when rotational speed of said rotary shaft attains a predetermined rotational speed.

2. The motor according to claim 1, wherein said predetermined pitch is 45°.

3. The motor according to claim 1, wherein said starting control unit and said free-running control unit each have a commutator which rotates in conformity with the rotational speed of said rotary shaft, and brushes which slide on the commutator.

4. The motor according to claim 1, wherein said starting control unit and said free-running control unit have an electronic controller changed over based upon information from rotary encoders provided on said rotary shaft.

5. The motor according to claim 3, wherein said operating-mode changeover means includes a weight provided on said rotary shaft for being displaced in conformity with centrifugal force, an arm which is displaced by actuation of said weight, and a brush assembly brought into contact with either said starting commutator or said free-running commutator by displacement of said arm.

6. The motor according to claim 1, wherein said operating-mode changeover means includes rotary encoders provided on said rotary shaft, a starting switching circuit and a free-running switching circuit, either of which is driven based upon information from said rotary encoders.

* * * * *